(12) United States Patent
Na

(10) Patent No.: US 9,897,838 B2
(45) Date of Patent: Feb. 20, 2018

(54) DISPLAY UNIT AND DISPLAY APPARATUS HAVING THE SAME

(71) Applicant: SAMSUNG ELECTRONICS CO., LTD., Suwon-si, Gyeonggi-do (KR)

(72) Inventor: Jeong Shan Na, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/304,669

(22) PCT Filed: Mar. 24, 2015

(86) PCT No.: PCT/KR2015/002872
§ 371 (c)(1),
(2) Date: Oct. 17, 2016

(87) PCT Pub. No.: WO2015/160103
PCT Pub. Date: Oct. 22, 2015

(65) Prior Publication Data
US 2017/0038633 A1 Feb. 9, 2017

(30) Foreign Application Priority Data
Apr. 15, 2014 (KR) .................... 10-2014-0044683

(51) Int. Cl.
*G02F 1/1333* (2006.01)
*G02F 1/1335* (2006.01)

(52) U.S. Cl.
CPC .. *G02F 1/133308* (2013.01); *G02F 1/133512* (2013.01); *G02F 1/133603* (2013.01);
(Continued)

(58) Field of Classification Search
CPC .................................................. G02F 1/1333
See application file for complete search history.

(56) References Cited

U.S. PATENT DOCUMENTS

2011/0149190 A1* 6/2011 Kim .................. G02F 1/133615
349/58
2012/0230008 A1* 9/2012 Ajichi .................. G02B 6/0056
362/19

(Continued)

FOREIGN PATENT DOCUMENTS

KR 10-2013-0025520 3/2013

OTHER PUBLICATIONS

International Search Report for PCT/KR2015/002872, dated Jun. 10, 2015, 3 pages.
(Continued)

*Primary Examiner* — Sang V Nguyen
(74) *Attorney, Agent, or Firm* — Nixon & Vanderhye, P.C.

(57) ABSTRACT

Disclosed are a display unit and a display apparatus, and more particularly, a display unit and a display apparatus having a middle mold bump provided with a second middle mold bump so that the light, which is penetrated a space between an opening of an optical sheet and a first middle mold bump inserted into the opening of the optical sheet, is limited from reaching at an active area of the display panel. Some of the present embodiments provide the display unit and the display apparatus having the middle mold bump provided with a second middle mold bump positioned under the display panel and configured to limit the light, which is penetrated through a space between an opening of the optical sheet and a first middle mold bump inserted into the opening of the optical sheet, from reaching at the active area of the display panel.

8 Claims, 7 Drawing Sheets

(52) U.S. Cl.
CPC ............... *G02F 1/133605* (2013.01); *G02F 2001/133317* (2013.01); *G02F 2001/133322* (2013.01); *G02F 2201/54* (2013.01)

(56) References Cited

U.S. PATENT DOCUMENTS

2013/0162506 A1* 6/2013 Kim .................... G06F 1/32
                                                        345/82
2013/0278870 A1* 10/2013 Kuo .................. G02F 1/133608
                                                        349/84

OTHER PUBLICATIONS

Written Opinion of the ISA for PCT/KR2015/002872, dated Jun. 10, 2015, 4 pages.

* cited by examiner

[Fig. 1]
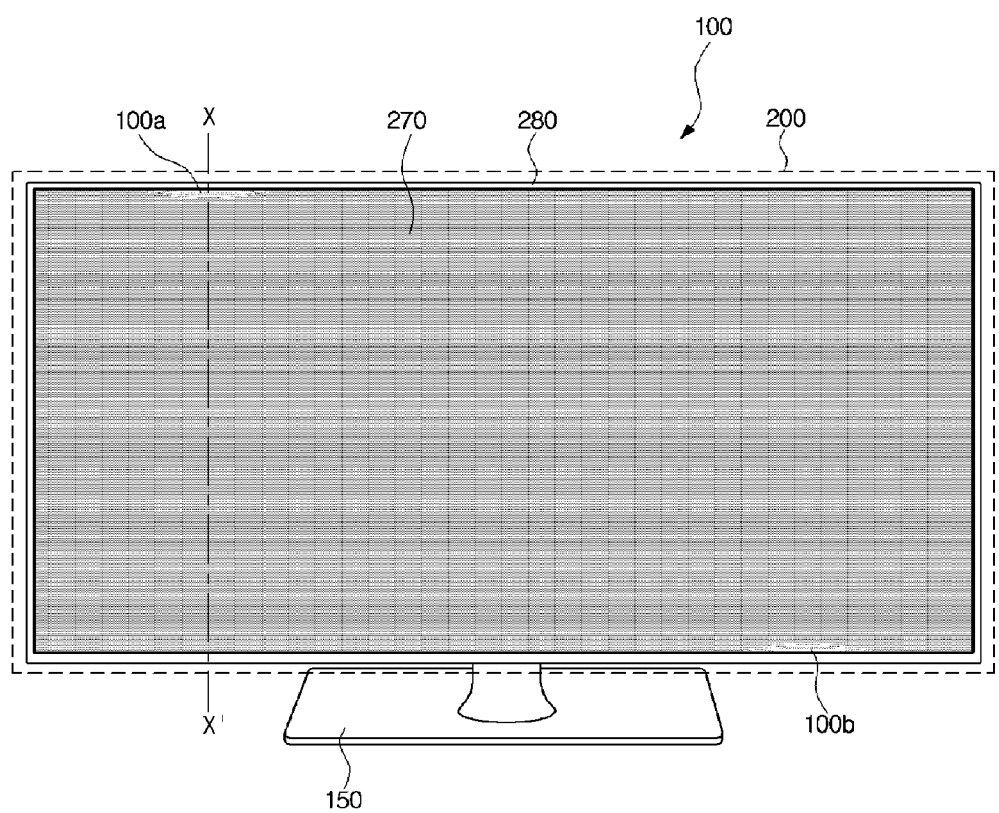

[Fig. 2]
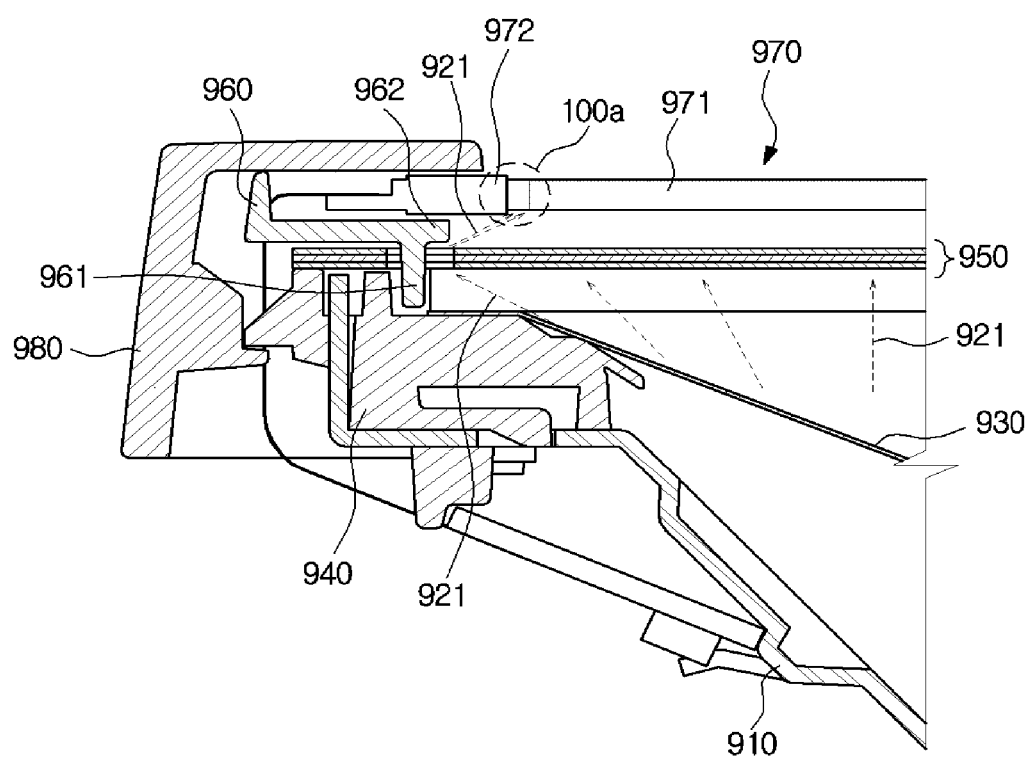

[Fig. 3]
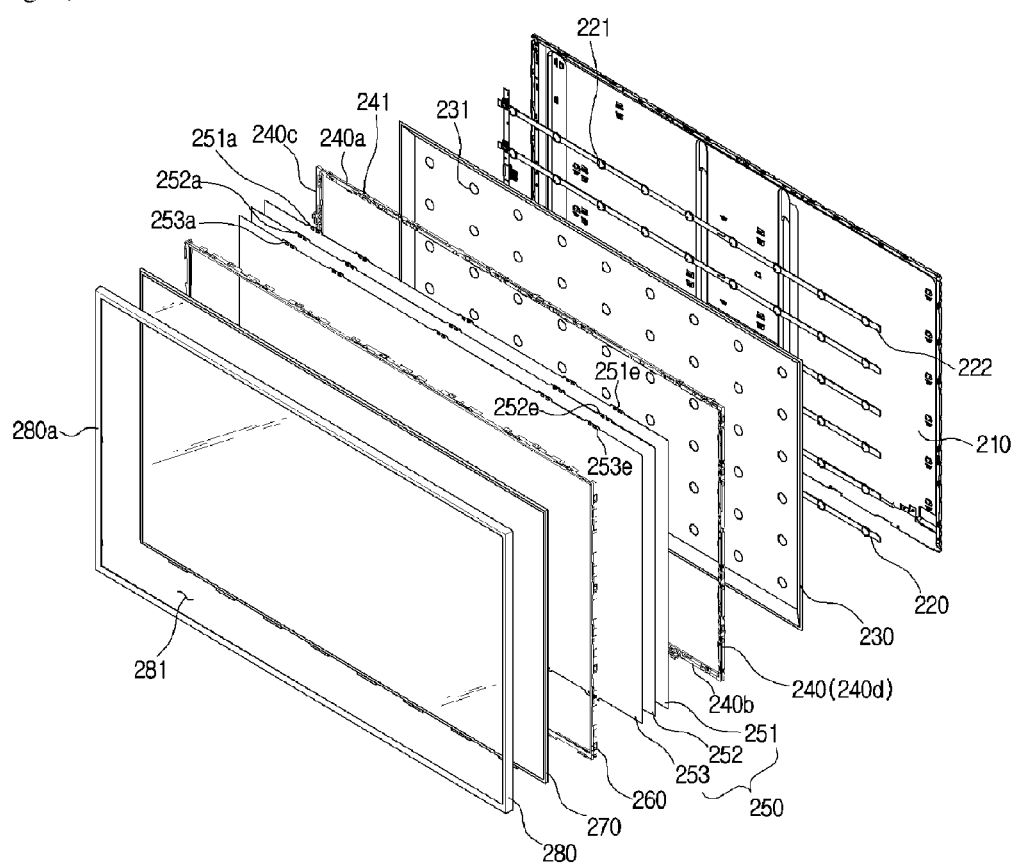

[Fig. 4]
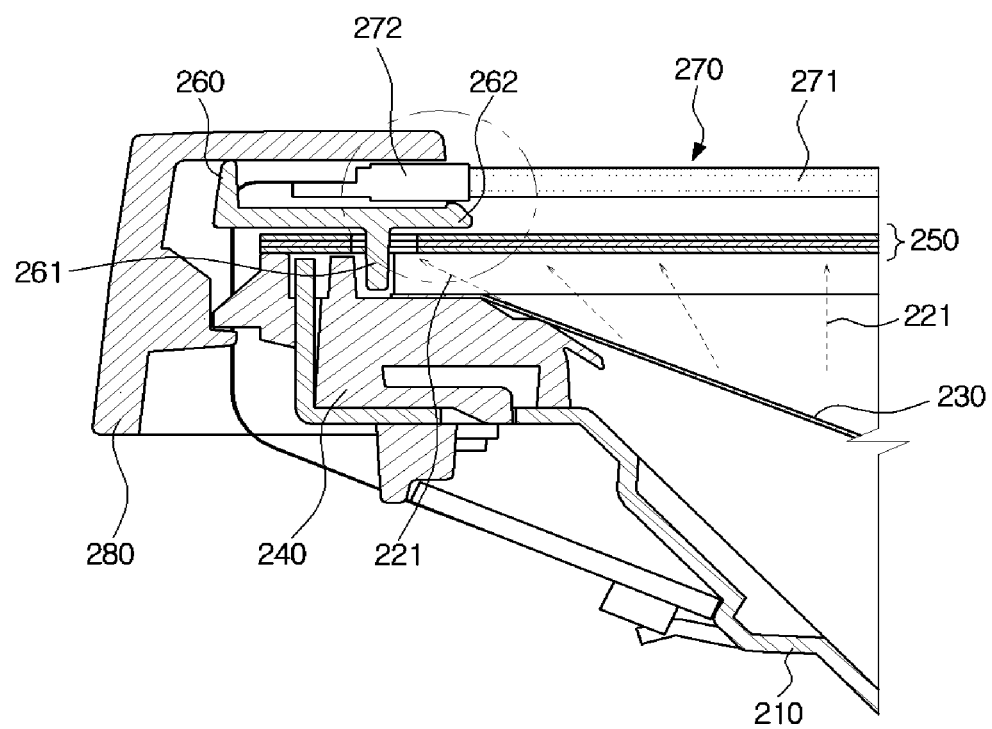

[Fig. 5]
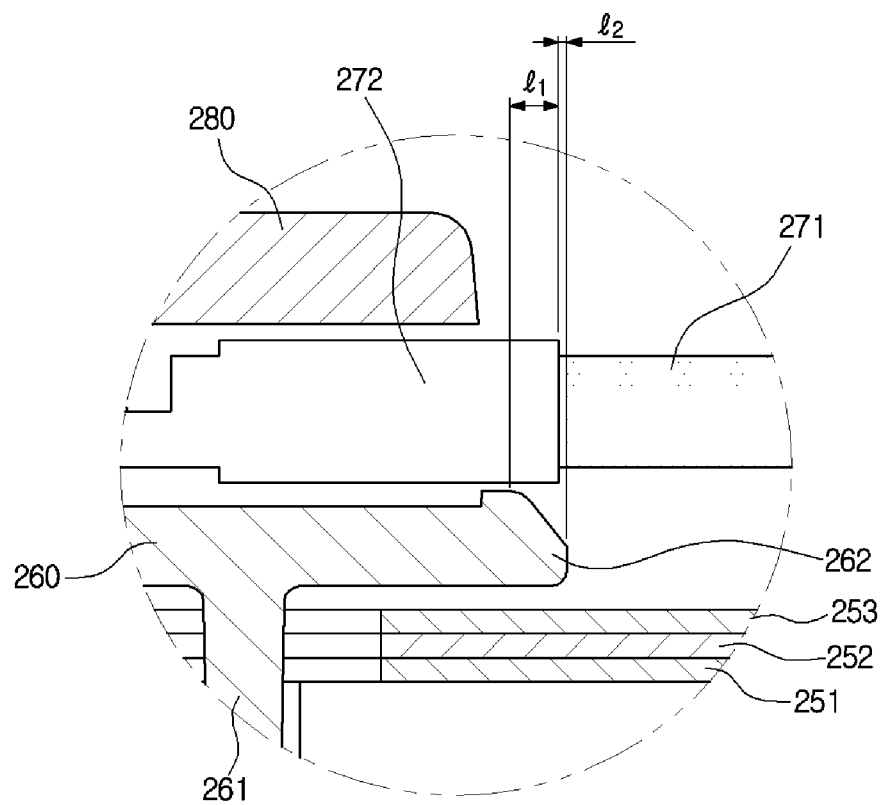

[Fig. 6]
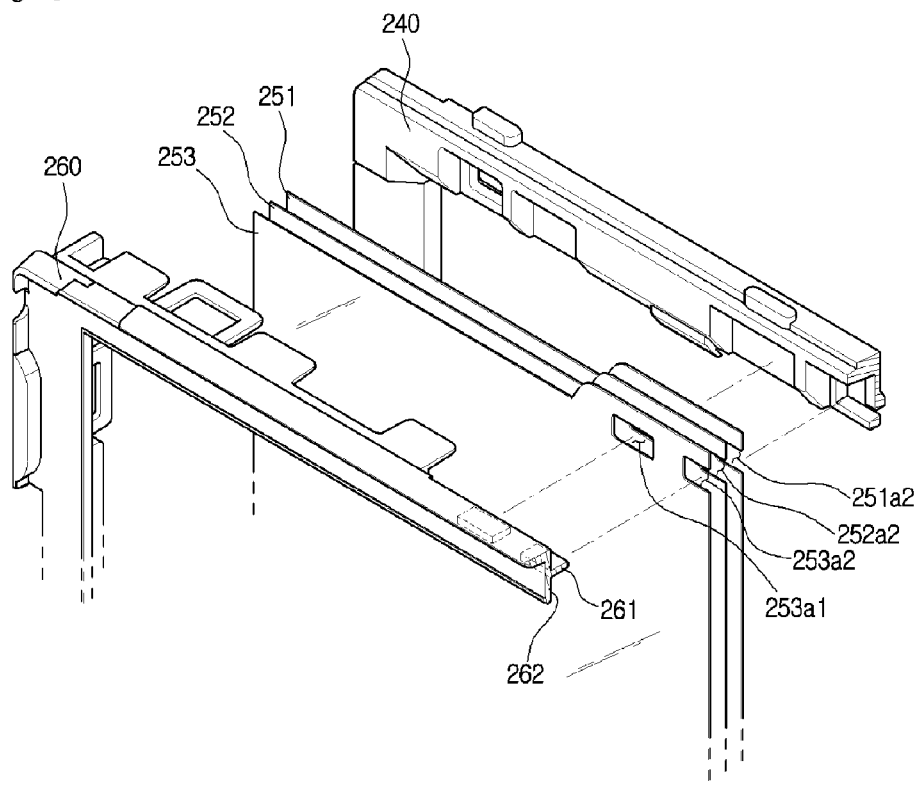
[Fig. 7]
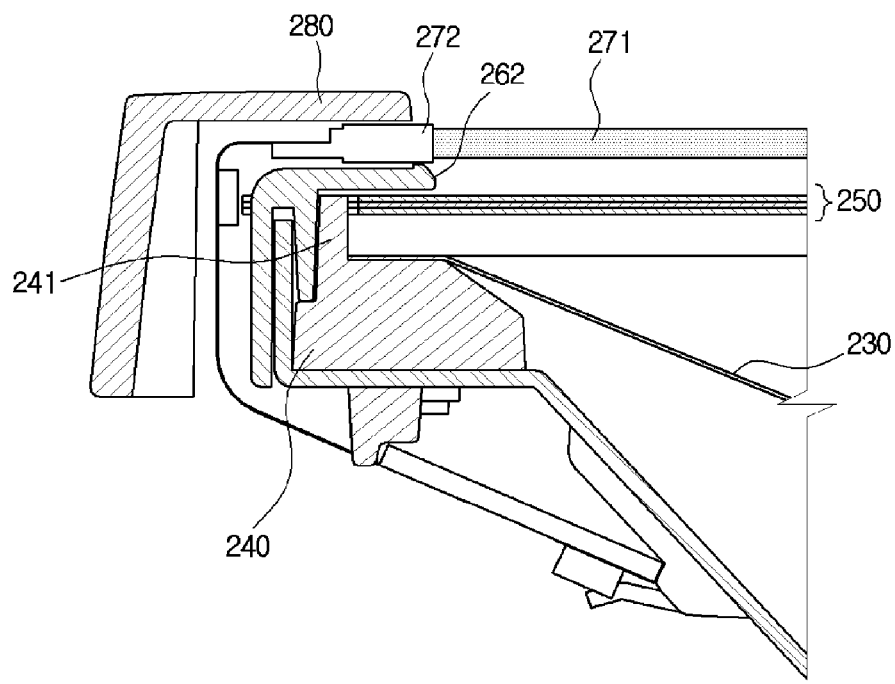

[Fig. 8]
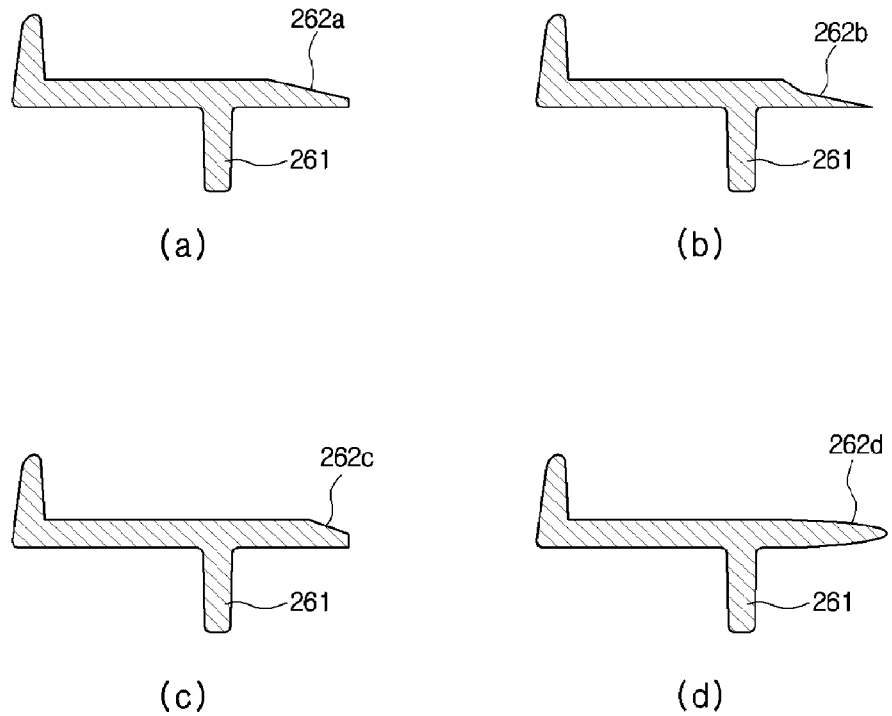
[Fig. 9]
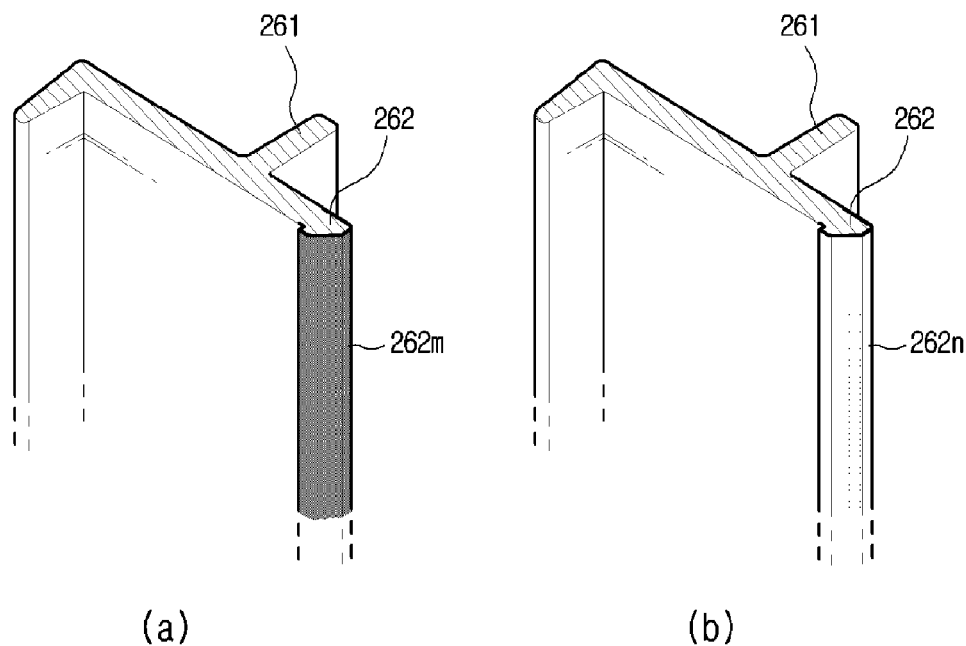

DISPLAY UNIT AND DISPLAY APPARATUS HAVING THE SAME

This application is the U.S. national phase of International Application No. PCT/KR2015/002872 filed 24 Mar. 2015, which designated the U.S. and claims priority to KR Patent Application No. 10-2014-0044683 filed 15 Apr. 2014, the entire contents of each of which are hereby incorporated by reference.

TECHNICAL FIELD

Disclosed are a display unit and a display apparatus, and more particularly, a display unit and a display apparatus having a middle mold bump provided with a second middle mold bump so that the light penetrating a space between an opening of an optical sheet and a first middle mold bump inserted into the opening of the optical sheet is limited from reaching at an active area of the display panel.

BACKGROUND ART

Recently, a display panel of a display apparatus is in pursuit of high resolutions, and the size of the display panel is becoming larger. The light source at an inside the display panel is becoming brighter according to the higher resolutions. The width of a top chassis covering the display panel and the thickness of the display apparatus are becoming thinner while corresponding to the display panel becoming larger. The thinner the gap is between the top chassis and the display panel, the greater the degree of immersion of a user is with respect to displayed images.

DISCLOSURE OF INVENTION

Technical Problem

The light of an inside light source, which is brightened as the gap between a top chassis and a display panel is narrowed and as the thickness of a display apparatus is thinner, may be leaked between the top chassis and the display panel, and cause light leakage.

Solution to Problem

According to an aspect of the present invention, there is provided a display unit of a display apparatus including: a display panel having an active area to display contents; an optical sheet having openings formed at a plurality of edges; a middle holder having a middle holder bump and configured to support the optical sheet; and a middle mold positioned under the display panel and having a plurality of middle mold bumps, and there is provided with the middle mold including; a first middle mold bump to support the optical sheet after penetrating through the opening of the optical sheet; and an inclined plane positioned at an area under the display panel, and provided with a second middle mold bump having one end thereof protruded from one side of the first middle mold bump to the active area as to face the display unit after passing through the boundary of a black matrix area and the active area.

According to one aspect of the present invention, from the entire length of the inclined plane of the second middle mold bump, a length of a portion of the inclined plane protruded toward the active area from under the active area may be shorter than a length of a remaining portion of the inclined plane positioned under the black matrix area.

According to another aspect of the present invention, there is provided a display unit of a display apparatus including: a display panel having an active area and a black matrix area to display contents; an optical sheet having a plurality of openings; a middle holder having a middle holder bump, and configured to support the optical sheet; and a middle mold positioned under the display panel, and having a plurality of middle mold bumps, and there is provided with the middle mold including; a first middle mold bump inserted into the opening of the optical sheet; and a second middle mold bump having one end thereof extended from under the active area toward the active area, and configured to limit the light that is radiated from a light source under the optical sheet to be incident at the display panel after penetrating through a space between the opening of the optical sheet and the first middle mold bump.

According to still another aspect of the present invention, there is provided a display apparatus including: a display unit; a stand to support the display unit; a display panel having an active area and a black matrix area to display contents; an optical sheet having openings formed at a plurality of edges; a middle holder having a middle holder bump, and configured to support the optical sheet; and a middle mold positioned under the display panel, and having a plurality of middle mold bumps, and there is provided with the middle mold including: a first middle mold bump to support the optical sheet after penetrating through the opening of the optical sheet; and an inclined plane positioned under the display panel, and provided with a second middle mold bump having one end thereof protruded from one side of the first middle mold bump to the active area as to face the display unit after passing through the boundary of a black matrix area and the active area.

Advantageous Effects of Invention

According to the above-described aspects of the present invention, a display unit and a display apparatus having a second middle mold bump, which is configured to limit the light that is radiated from a light source to be incident at a display panel after passing through a space between an opening of an optical sheet and a first middle mold bump inserted into the opening of the optical sheet, may be provided.

According to the above-described aspects of the present invention, the display unit and the display apparatus having the second middle mold bump, which is provided with one end thereof extended from under an active area of the display panel toward the active area, may be provided.

According to the above-described aspects of the present invention, the display unit and the display apparatus having the second middle mold bump parallelly protruded from one side of the first middle mold bump with respect to the display panel may be provided.

According to the above-described aspects of the present invention, the display unit and the display apparatus, with respect to a middle holder and a middle mold that are facing each other, which is provided with one of the middle holder bump and the first middle mold bump configured to support the optical sheet after passing through the opening of the optical sheet, may be provided.

According to the above-described aspects of the present invention, the display unit and the display apparatus having the second middle mold bump, which is positioned at an area under a black matrix area of the display panel while provided with one end thereof protruded toward the active area at an area under the active area after passing through from one side of the first middle mold bump to an area under a boundary of the black matrix area and the active area of the display panel, may be provided.

According to the above-described aspects of the present invention, the display unit and the display apparatus having the second middle mold bump, which is provided with one end thereof protruded by less than about 2.0 mm from an area under the active area toward the active area while having a boundary of the black matrix area and the active area of the display panel as a reference, may be provided.

According to the above-described aspects of the present invention, the display unit and the display apparatus, which is provided with an angle between the first middle mold bump and the second middle mold bump greater than about 70° and less than 120° at the middle mold positioned under the display panel, may be provided.

According to the above-described aspects of the present invention, the display unit and the display apparatus having an inclined plane, which is positioned at an area under the display panel while provided with one end of the second middle mold bump facing the display panel as the one end of the second middle mold bump is protruded from one side of the first middle mold bump to the active area after passing through a boundary of the black matrix area and the active area, may be provided.

According to the above-described aspects of the present invention, the display unit and the display apparatus, with respect to a length of the entire inclined plane of the second middle mold bump, which is provided with a length of a portion of the inclined plane protruded from under the active area to the active area shorter than a length of a remaining portion of the inclined plane positioned under the black matrix area, may be provided.

According to the above-described aspects of the present invention, the display unit and the display apparatus having the second middle mold bump, which is provided with one end thereof having the shape of a curvature, may be provided.

According to the various embodiments of the present invention while not limited hereto, a display unit and a display apparatus having a second middle mold bump, which is configured to limit the light that is radiated from a light source to be incident at a display panel after passing through a space between an opening of an optical sheet and a first middle mold bump inserted into the opening of the optical sheet, may be provided.

BRIEF DESCRIPTION OF DRAWINGS

FIG. 1 is a schematic frontal view showing a display apparatus according to an embodiment of the present invention.

FIG. 2 is a schematic cross-sectional view showing a display unit of a conventional display apparatus.

FIG. 3 is a schematically exploded perspective view showing a display unit of the display apparatus according to an embodiment of the present invention.

FIG. 4 is a schematic cross-sectional view showing the display unit of the display apparatus according to an embodiment of the present invention.

FIG. 5 is an enlarged cross-sectional view showing a middle mold according to an embodiment of the present invention.

FIG. 6 is a schematic cross-sectional view showing an optical sheet and a middle mold bump according to an embodiment of the present invention.

FIG. 7 is a schematic cross-sectional view showing a display unit of the display apparatus according to another embodiment of the present invention.

FIGS. 8(a), 8(b), 8(c) and 8(d) are schematic cross-sectional views showing a middle mold bump according to another embodiment of the present invention.

FIGS. 9(a) and 9(b) are schematic cross-sectional views showing a surface treatment of the middle mold bump according to another embodiment of the present invention.

BEST MODE FOR CARRYING OUT THE INVENTION

Hereinafter, the present invention will be described more fully with reference to the accompanying drawings, in which exemplary embodiments of the invention are shown. Also, the methods of manufacturing and using the present invention will be described more fully by referring to the contents of the attached drawings. The identical reference numbers and denotations suggested on each of the drawings refer to the parts or components that are provided to perform identical functions.

The terminologies including ordinal expressions such as "a first," and "a second" may be used in describing various components, while the components are not limited by the scopes of the above terminologies. The above terminologies may only be used as to distinguish one component from a different component. For example, while not deviated from the scopes of the present invention, a terminology "a first component" may be designated as "a second component," and similarly, "a second component may be designated as "a first component." A terminology "and/or" may include a certain one of a combination of a plurality of categories provided, or a certain one of a plurality of categories provided.

A terminology "contents" may include broadcasted materials, videos, images, texts, and/or web documents.

The terminologies used in the present invention are used for the purpose of describing the embodiments, while not intended to limit and/or restrict the present invention. A singular expression includes both singular and plural terms unless specified clearly. In the present invention, terminologies such as "includes/including" or "have/having/provided" are used for the purpose of demonstrating a presence of certain characteristic, feature, numeric figure, stage, motion, component, part, or a combination of such that are described in the present document, and the terminologies as such should be understood that the present invention does not exclude a possibility of having the presence of more than one of the characteristic, features, numeric figure, stage, motion, component, part, or the combination of such. The identical reference numbers and denotations suggested on each of the drawings refer to the parts or components that are provided to perform identical functions.

FIG. 1 is a schematic frontal view showing a display apparatus according to an embodiment of the present invention.

Referring to FIG. 1, a display apparatus 100 includes a display unit 200, and a stand 150 to support the display unit 200.

A body 101 includes the display unit 200 having a display panel 270 to display contents, and a top chassis 280 to support the display panel 270. The stand 150 may include a wall mount (not shown) to support the body 101 from a wall surface.

Referring to FIG. 1, in a case when a black screen is displayed on the display panel 270 without a presence of a light source, such as a lighting, at the surroundings, by light leakages 100a and 100b, certain portions of the edges of the display panel 270 may seem brighter than the black color displayed at a central area of the display panel 270.

FIG. 2 is a schematic cross-sectional view showing a display unit of a conventional display apparatus.

Referring to FIG. 2, a conventional display unit 900 includes a bottom chassis 910, a LED bar (not shown), a reflector sheet 930, a middle holder 940, an optical sheet 950, a middle mold 960, a display panel 970, and a top chassis 980.

The middle holder 940 and the middle mold 960 support the optical sheet 950. A certain one of middle holder bumps (not shown) or first middle mold bumps 961 may support optical sheets 951 to 953 while inserted into openings 951a1, 952a1, and 953a1.

In a case when a black screen is displayed on the display panel 970 of the display unit 900 without a presence of a light source, light 921, which is radiated from a light source (not shown) that is supported under the bottom chassis 910, is incident at the display panel 970 by the reflector sheet 930 and the optical sheet 950. Some of the light may penetrate through a space between a certain one, for example, the opening 951a1, of the openings of the optical sheet 950 and the first middle mold bump 961. The some of the light penetrated through the space is incident at a boundary area between an active area 971 and a black matrix area 972 of the display panel 970. Some of the remaining light may be incident at a boundary area between the active area 971 and the black matrix area 972 of the display panel 970 without occurred by the light incident at the boundary area between the active area 971 and the black matrix area 972 of the display panel 970.

Since one end of a second middle mold bump 962 positioned at one side of the first middle mold bump 961 is present within the black matrix area 972, the proceeding of the incident light is difficult to be interrupted. The one end of the second middle mold bump 962 is not provided to penetrate through the opening of the optical sheet, and is positioned above the opening of the optical sheet.

In a case when the one end of the second middle mold bump 962 is extended lengthways from under the display panel 970 toward the active area 971 as to prevent the light leakages 100a and 100b from occurring at the boundary area between the active area 971 and the black matrix area 972 of the display panel 970, the one end of the second middle mold bump 962 may be recognized by a user watching the contents. The light leakages 100a and 100b occurred at the boundary area between the active area 971 and the black matrix area 972 of the display panel 970 are needed to be prevented, and the one end of the second middle mold bump 962 is needed to be provided not to be recognized by a user watching the contents.

FIG. 3 is a schematically exploded perspective view showing the display unit of the display apparatus according to an embodiment of the present invention.

FIG. 4 is a schematic cross-sectional view showing the display unit of the display apparatus according to an embodiment of the present invention.

Referring to FIG. 3, the display unit 200 includes a bottom chassis 210, a light source 220, a reflector sheet 230, a middle holder 240, an optical sheet 250, a middle mold 260, the display panel 270, and the top chassis 280.

*The bottom chassis 210 accommodates the components 220 to 270. The bottom chassis 210 is provided with strength that is greater than plastic material, and may include metallic material, for example, aluminum, having low heat deformity by the heat generated from the light source 220 and/or the display panel 270.

The light source 220 is accommodated under the bottom chassis 210, and generates light by a power supplied from an outside. The light source 220 is provided to perform a role as a backlight at the display apparatus 100 by radiating light toward the display panel 270.

The light source 220 may include a plurality of LED bars 222 while the each of the plurality of LED bars 220 includes a plurality of LEDs 221. The LED bars 222 are parallelly disposed at an inside, for example, at a bottom, of the bottom chassis 210 while spaced apart to each other. Also, the plurality of LED bars 222 may be disposed at side surfaces, for example, at a plurality of surfaces among the upper/lower/left/right side surfaces, or at all surfaces of surfaces among the upper/lower/left/right side surfaces, of the bottom chassis 210.

The reflector sheet 230 is disposed at an upper portion of the light source 220, and improves optical efficiency by reflecting the leaking light toward the display panel 270. The reflector sheet 230 may be coated with high reflective coating material, for example, silver or Ti02, provided in white or silver. The reflector sheet 230 may be provided with a plurality of openings 231 corresponding to the protrusions of the plurality of LEDs 221 positioned at the bottom chassis 210. The plurality of LEDs 221 protruded from the openings 231 of the reflector sheet radiates light toward the optical sheet 250.

The middle holder 240 may support the optical sheet 250 by using a plurality of middle holder bumps 241. The middle holder 240 is positioned at a plurality of edges, for example, at all four edges, or at less than three edges, of the bottom chassis 210. The light radiated from the light source 220 may be incident at the optical sheet 250 without an interference of the middle holder 240.

The middle holder 240 includes the middle holder bumps 241 at upper middle holders 240a and lower middle holders 240b at the plurality of edges thereof. The middle holder bumps 241 may be formed in pairs, for example, in two units of bumps. Also, the middle holder bumps 241 may be formed in a single bump. The number of the middle holder bumps 241 may be less than the number of the openings of the optical sheet. For example, in a case when the number of the openings of the optical sheet is 6, that is, the openings 251a to 251f, the number of the middle holder bumps may be ½ the number of the openings of the optical sheet, which is 3, that is, the middle holder bumps 241a to 241c.

The middle holder 240 may include middle holder bumps (not shown) at each of left side middle holder 240c and right side middle holder 240d of the four edges, not at the upper middle holder 240a and the lower middle holder 240b.

The optical sheet 250 is positioned above the middle holder 240, and the light source 220 may be positioned under of the middle holder 240. One side of the reflector sheet 230 may be positioned under the middle holder 240.

The optical sheet 250 may be provided such that the light penetrated after radiated from the light source 220 may have a uniform luminosity. The light having uniform luminosity passed through the optical sheet 250 is incident at the display panel 270.

The optical sheet 250 includes a plurality of sheets 251 to 253 reciprocally overlapped at certain one of the middle hold bumps 241 and first middle mold bumps 261. The optical sheet 250 may include a protective sheet, a prism sheet, or a diffusion sheet. The optical sheet 250, if not three sheets, may include a single sheet, two sheets, or more than four sheets. Also, the optical characteristic of the optical sheet 250 may be changed depending on the number of the optical sheets 250 of the display unit 200.

The first sheet 251 may be provided with the plurality of openings 251a to 251f at a plurality of protruded areas formed at side surfaces thereof. The opening 251a may include one opening 251a1 or a plurality of openings 251a1 and 251a2. The plurality of protruded areas of the other sheets 252 and 253 and the plurality of openings may be identical to the case of the first sheet 251.

The optical sheet 250 is supported by the middle holder bumps 241a inserted through some of the openings among the openings 251a to 253j. Also, the optical sheet 250 may be supported by certain one of the middle holder bumps 241a and the middle holder bumps 241a inserted through some of the openings among the openings 251a to 253j.

The number of the openings 251a to 251j may correspond to the number of the middle holder bumps 241. For example, in a case when the number of the openings 251a to 251j is 10, the number of the middle holder bumps 241 may be 5 or less than 4. Also, the number of the openings 251a to 251f may correspond to the number of the middle holder bumps 241 and the number of the first middle mold bumps 261. For example, in a case when the number of the openings 251a to 251j is 10, the sum of the number of the middle holder bumps 241 and the number of the first middle mold bumps 261 may be 10 or less than 9.

The gap between the upper openings 251a to 251e among the openings 251a to 251j of the sheet 251 may be provided to be shorter than the gap between the lower openings 251f to 251j by considering heat expansion of the sheet.

The optical sheet 250 may be positioned above the middle holder 240. A diffuser configured to diffuse the light radiated from the light source 220 may be positioned between the middle holder 240 and the optical sheet 250.

*The middle mold 260 is positioned under of the display panel 270, and supports the display panel 270. Also, the middle mold 260 is positioned under the display panel 270, and may space apart the display panel 270 and the optical sheet 250 by greater than the thickness of a second middle mold 262.

The middle mold 260 includes the first middle mold bump 261 to support the optical sheet. Also, the middle mold 260 supports the optical sheet 250 together with the middle holder bump 241 of the middle holder 240. The first middle mold bump 261 may support the optical sheet 250 while inserted into the optical sheet opening 251a1.

The middle mold 260 includes the plurality of first middle mold bumps 261 at upper middle molds 260a and lower middle molds 260b at the plurality of edges thereof. The first middle mold bumps 261 may be formed in pairs, for example, in two units of bumps. Also, the first middle mold bumps 261 may be formed in a single bump. The number of the first middle holder bumps 261 may be less than the number of the openings of the optical sheet. For example, in a case when the number of the openings of the optical sheet is 6, that is, the openings 251a to 251f, the number of the first middle holder bumps may be ½ the number of the openings of the optical sheet, which is 3, that is, the middle holder bumps 261a to 261c.

The middle holder bumps 241 and the first middle mold bumps 261 facing each other to support the optical sheet 250 may be disposed while reciprocally intersected to each other. For example, in a case when the middle holder bumps 241 are inserted into the openings 251b of the optical sheet, the first middle mold bumps 261 facing the middle holder bumps 241 may not be disposed. In a case when the first middle mold bumps 261 are inserted into the openings 251 of the optical sheet, the middle holder bumps 241 facing the first middle mold bumps 261 may not be disposed.

The middle mold 260 includes the second middle mold 262 formed at one side of the first middle mold bump 261. The second middle mold bump 262 may be parallelly protruded with respect to the optical sheet 250, for example, toward an active area 271 from a black matrix area 272 of the display panel 270.

The position of one end of the second middle mold bump 262 positioned at an area under the display panel 270 may be explained while having the active area 271 of the display panel 270 and the boundary between the black matrix area 272 and the active area 271 of the display panel 270 as a reference.

For example, one end of the second middle mold bump 262, which is positioned at an area under the display panel 270, is positioned at an area under the active area 271 of the display panel 270. The second middle mold bump 262 is extended from one end of the first middle mold bump 261, which is positioned under the black matrix area 272 of the display panel 270, and is passed through an area under the boundary of the black matrix area 272 and the active area 271 of the display panel 270. Finally, the one end of the second middle mold bump 262 is positioned at an area under the active area 271 of the display panel 270.

The second middle mold bump 262 may be extended from one side of the first middle mold bump 261 positioned at an area under the black matrix area 272 of the display panel 270.

One end of the second middle mold bump 262 may be extended into the active area 271 through the black matrix area 272 of the display panel 270. For example, the one end of the second middle mold bump 262 may be extended by about 0.3 mm into the active area 271 of the display panel 270. The one end of the second middle mold bump 262 includes an inclined plane. The angle between the first middle mold bump 261 and the second middle mold bump 262 may approximately be a right angle. Also, the angle between the first middle mold bump 261 and the second middle mold bump 262 may be between about 70° and about 120°.

The material of the middle mold 260 may include ABS resin (acrylonitrile-butadiene-styrene resin) and/or glass fiber. Also, the middle mold 260 may include various plastic, resin, and/or metallic materials.

The display panel 270 includes a thin-film transistor (TFT) board and a liquid crystal. Also, the display panel 270 may include a polarizing plate (not shown) and/or a color filter (not shown).

The display panel 270 includes the active area 271 configured to display the contents by using the radiated light, and the black matrix area 272, which is a non-active area, provided not to display the contents while wrapping around the edges of the active area 271. The middle mold 260 is positioned under the display panel 270.

The top chassis 280 is fastened to the bottom chassis 210 accommodating the components 220 to 270 of the display unit 200. The top chassis 280 may protect the components 220 to 270 that are disposed and accommodated at a front surface of the display unit 200, from an impact of an outside, and/or prevent a leakage of the light, for example, a loss of light, that is radiated from the inside light source 220.

The top chassis 280 is provided with the shape of cross section, for example, the shape of '⌐,' as to cover an upper surface and the borders of the side surfaces of the display panel 270. The top chassis 280 includes an opening 281. A front surface 280a of the four edges, excluding the opening 281 of the top chassis 280, may be referred to as a 'bezel.' The contents being output from the display panel 270 may be provided through the opening 281. The entire active area 271 and a portion, for example, the area within about 5 mm from the edges that are present toward the opening of the bezel, of the black matrix area 272 of the display panel 270 are displayed through the opening 281. Also, a portion of the black matrix area 272, for example, the area within about 15 mm from the edges that are present toward the opening of the bezel, may be displayed through the opening.

The display apparatus 100 may be lightweight and miniaturized as the width of the bezel is narrower. Also, the degree of immersion into the contents of the display apparatus 100 may be increased as the width of the bezel is narrower.

In a case when a black screen is displayed at the display panel 270 of the display unit 200 without the surrounding light source, the light 221 radiated from the light source 220, which is supported at the bottom of the bottom chassis 910, is incident at the display panel 270 by the reflector sheet 230 and the optical sheet 250. Some of the light may penetrate through the space between one of the openings of the optical sheet 250, for example, the opening 251a1, and the first middle mold bump 261. The proceeding of the some of the light, which is penetrated through the space between the opening 251a1 of the optical sheet 250 and the first middle mold bump 261, toward the display panel 270 may be interrupted by a second middle mold bump 292. The some of the light penetrated through the space between the opening 251a1 of the optical sheet 250 and the first middle mold bump 261 may be incident at the optical sheet 250 by the second middle mold bump 292. Also, the some of the light penetrated through the space between the opening 251a1 of the optical sheet 250 and the first middle mold bump 261 may be returned after reflected by the second middle mold bump 292.

The occurrence of the light leakage by the openings 251a to 253j of the optical sheet may be limited by using one end of the second middle mold bump 292 that is extended into the active area 271 of the display panel 270.

FIG. 5 is an enlarged cross-sectional view showing the middle mold according to an embodiment of the present invention.

FIG. 6 is a schematic cross-sectional view showing the optical sheet and the middle mold bump according to an embodiment of the present invention.

Referring to FIG. 5 and FIG. 6, the structures of the display panel 270, the middle mold 260, and the optical sheet 250 may be appreciated. The first middle mold bumps 261 that are positioned above the optical sheet 250 are provided to penetrate openings 251a, 252a, and 253a of the optical sheet. The light radiated from the light source 220 may penetrate through the spaces between the first middle mold bumps 261 and the openings 251a, 252a, and 253a. The penetrated lights are reached at bottom surfaces of the first middle mold bumps 261. Some of the lights that are reached at the bottom surfaces may be reflected and returned to the spaces between the first middle mold bumps 261 and the openings 251a, 252a, and 253a of the optical sheet. Also, the some of the lights that are reached at the bottom surfaces may be reflected to the optical sheet 250.

The length of the second middle mold bump 262 positioned above the optical sheet 250 may be about 3 mm while having the point at which the first middle mold bump 261 makes contact with the second middle mold bump 262 as a reference. For example, the length of the second middle mold bump 262 may be in the range of about 1 mm and 8 mm while having the point at which the first middle mold bump 261 makes contact with the second middle mold bump 262 as a reference. The length of the second middle mold bump 262 positioned under the display panel 270 may be sufficient if provided with the length that may limit the light already reached from reaching at the display panel 270.

The one end of the second middle mold bump 262 positioned at an area under the display panel 270 is protruded toward the active area 271 after passing through an area under the boundary of the active area 271 and the black matrix area 272 of the display panel 270.

The one end of the second middle mold bump 262 positioned at an area under the display panel 270 is protruded by less than about 0.1 mm, for example, I2, toward the active area 271 after passing through the area under the boundary of the active area 271 and the black matrix area 272 of the display panel 270 while having the boundary of the active area 271 and the black matrix area 272 of the display panel 270 as a reference. The one end of the second middle mold bump 262 positioned at an area under the display panel 270 is protruded by less than about 2.0 mm toward the active area 271 after passing through the area under the boundary of the active area 271 and the black matrix area 272 of the display panel 270 while having the boundary of the active area 271 and the black matrix area 272 of the display panel 270 as a reference. A portion of the inclined plane, for example, the portion corresponding to the I2, of the second middle mold bump 262 positioned at an area under the display panel 270 is protruded toward the active area 271 after passing through the area under the boundary of the active area 271 and the black matrix area 272 of the display panel 270 while having the boundary of the active area 271 and the black matrix area 272 of the display panel 270 as a reference. Also, a portion of the inclined plane, for example, the portion corresponding to an I1, of the second middle mold bump 262 positioned at an area under the display panel 270 is positioned at the black matrix area 272 from the boundary of the active area 271 and the black matrix area 272 of the display panel 270. For example, the portion of the inclined plane I2 may be in the range of about 0.2 mm and about 0.5 mm.

The inclined plane at the one end of the second middle mold bump 262 positioned at an area under the display panel 270 is provided to face the display panel 270. The inclined plane at the one end of the second middle mold bump 262 is provided to face the active area 271 and the black matrix area 272 of the display panel 270.

The one end of the second middle mold bump 262 positioned at an area under the display panel 270 includes an inclined plane 262m. The one end of the second middle mold bump 262 may be provided with an angle of about 45°, for example, an angle in the range of about 30° and about 60°, while having a bottom surface of the second middle mold bump 262 of a surface of the optical sheet 250.

FIGS. 8(a)-8(d) are schematic cross-sectional views showing the middle mold bump according to another embodiment of the present invention.

Referring to FIGS. 8(a) and 8(c), inclined planes 262a and 262c of the second middle mold bump 262 may be provided with an angle between the range of about 15° and about 45° while having a surface of the bottom surface of the second middle mold bump 262 or a surface of the optical sheet 250. In a case when the angle of an inclined plane 262b of the second middle mold bump 262 is less than about 45°, the inclined planes 262a and 262c of the second middle mold bump 262 are increased by the length of about the I1 compared to the inclined plane 262m of the second middle mold bump 262. Also, in a case when the angle of the inclined plane 262b of the second middle mold bump 262 is less than about 45°, with respect to the inclined planes 262a and 262c of the second middle mold bump 262, more of the inclined planes may be positioned at the black matrix area 272 compared to compared to the inclined plane 262m of the second middle mold bump 262.

Referring to FIG. 8(b), the inclined plane 262b of the second middle mold bump 262 is not provided in a single inclined plane, but includes a plurality of linear lines having different inclinations to each other. The inclined plane 262b of the second middle mold bump 262 may be provided with a plurality of angles, for example, 15° and 45°, by corresponding to the plurality of linear lines.

Referring to FIG. 8(d, one end 262d of the second middle mold bump 262 may be a curved line having a single curvature or a plurality of curvatures. As much as the curvature is larger, the more of the one end 262d of the second middle mold bump 262 may be positioned at the black matrix area 272.

Although not illustrated in FIGS. 8(a)-8(d), the one end of the second middle mold bump 262 may be provided in the shape of steps, a triangle, or an oval.

The length and/or cross section of the second middle mold bump 262 may be changed by corresponding to the structure of the display unit 200 may be easily appreciated by those skilled in the art.

FIG. 7 is a schematic cross-sectional view showing the display unit of the display apparatus according to another embodiment of the present invention.

When comparing FIG. 4 and FIG. 7, the middle mold 260 of FIG. 4 includes the first middle mold bump 261 and the second middle mold bump 262, the middle mold 260 of FIG. 7 includes only the second middle mold bump 262. The middle mold 260 may be provided only with the second middle mold bump 262 by corresponding to the opening of the optical sheet 250, or may be provided with the both of the first middle mold bump 261 and the second middle mold bump 262.

The optical sheet 250 may be supported by the middle holder bump 241 and the first middle mold bump 261. The middle mold bump 241 and the first middle mold bump 261 facing each other as to support the optical sheet 250 may be disposed while reciprocally intersected to each other. The one of the middle holder bump 241 and the first middle mold bump 261 may be disposed. For example, referring to FIG. 4, in a case when the first middle mold bump 261 is inserted into the opening 251 of the optical sheet, the facing middle holder bump 241 may not be disposed. Also, referring to FIG. 7, in a case when the middle holder bump 241 is inserted into the opening 251 of the optical sheet, the facing first middle mold bump 261 may not be disposed.

On FIG. 7, the remaining components of the display unit 200 excluding the first middle mold bump 261 are identical to the components of the display unit 240 described on FIG. 4, and the overlapped descriptions will be omitted.

FIGS. 9(a) and 9(b) are schematic cross-sectional views showing a surface finishing of the middle mold bump according to another embodiment of the present invention.

Referring to FIGS. 9(a) and 9(b), the surface of the one end of the second middle mold bump 262 is provided with treatment. The surface treatment may be differentiated according to the brightness, luminosity, and/or lighting of the light source 220. Considering the luminosity of the light incident at the display panel 270, the surface treatment with white is preferred, but the surface treatment may be changed depending on the conditions of luminosity of the light source 220. Considering the area seen brighter than the surroundings of the boundary area of the active area 271 and the black matrix area 272 of the bezel and the display panel 270, the surface treatment may be provided in black.

In a case when the luminosity of the light source 220 of the display unit 200 according to the present invention is about 450 nit cd/m$^2$, the one end of the second middle mold bump 262 may be surface-treated 290m, for example, coated, by using black coating material as seen in FIG. 9(a). The one end of the second mold bump 262 is coated with black coating material considering reflectivity. Also, in FIG. 9(b), the one end of the second middle mold bump 262 may be surface-treated 290n, for example, coated, by using white coating material, considering reflectivity. In a case when the luminosity of the light source 220 is changed, the surface treatment with respect to the one end of the second middle mold bump 262 may also be changed.

Although not illustrated in FIGS. 9(a) and 9(b), the one end of the second middle mold bump 262 may be coated with grey, silver, or two-tone, for example, white/silver, white/grey, white/black, or grey/black). Also, the one end of the second middle mold bump 262 may be alternatively coated, as in chess board, by using white, grey, silver, and/or black.

Although a few embodiments of the present disclosure have been shown and described, it would be appreciated by those skilled in the art that changes may be made in these embodiments without departing from the principles and spirit of the disclosure, the scope of which is defined in the claims and their equivalents.

The invention claimed is:

1. A display unit, comprising:
    a display panel having an active area and a black matrix area to display contents;
    an optical sheet having openings formed at a plurality of edges;
    a middle holder having a middle holder bump and to support the optical sheet; and
    a middle mold positioned under the display panel and having a plurality of middle mold bumps, and the middle mold, comprising;
    a first middle mold bump to support the optical sheet after penetrating through the opening of the optical sheet; and
    an inclined plane positioned at an area under the display panel, and provided with a second middle mold bump having one end thereof protruded from one side of the first middle mold bump to the active area as to face the display unit after passing through the boundary of a black matrix area and the active area.

2. The display unit of claim 1, wherein:
    one end of the second middle mold bump is protruded by less than about 2.0 mm from an area under the active area toward the active area while having a boundary of the black matrix area and the active area of a display panel as a reference.

3. The display unit of claim 1, wherein:
    an angle between the first middle mold bump and the second middle mold bump greater than about 70° and less than 120°.

4. The display unit of claim 1, wherein:
    with respect to a length of an entire inclined plane of the second middle mold bump, a length of a portion of the inclined plane protruded from under the active area to the active area is shorter than a length of a remaining portion of the inclined plane positioned under the black matrix area.

5. The display unit of claim 1, wherein:
the one end of the second middle mold bump is provided with the shape of a curvature.

6. The display unit of claim 1, wherein:
the one end of the second middle mold bump is provided with a surface treatment, and
the surface treatment is provided by performing a coating using at least one of white, grey, silver, and/or black.

7. A display unit, comprising:
a display panel having an active area and a black matrix area to display contents;
an optical sheet having a plurality of openings;
a middle holder having a middle holder bump, and to support the optical sheet; and
a middle mold positioned under the display panel, and having a plurality of middle mold bumps, and
the middle mold, comprising;
a first middle mold bump inserted into the opening of the optical sheet; and
a second middle mold bump having one end thereof extended from under the active area toward the active area, and to limit the light radiated from a light source under the optical sheet to be incident at the display panel after penetrating through a space between the opening of the optical sheet and the first middle mold bump.

8. A display apparatus, comprising:
a display unit;
a stand to support the display unit;
a display panel having an active area and a black matrix area to display contents;
an optical sheet having openings formed at a plurality of edges;
a middle holder having a middle holder bump, and to support the optical sheet; and
a middle mold positioned under the display panel, and having a plurality of middle mold bumps, and
the middle mold, comprising:
a first middle mold bump to support the optical sheet after penetrating through the opening of the optical sheet; and
an inclined plane positioned under the display panel, and provided with a second middle mold bump having one end thereof protruded from one side of the first middle mold bump to the active area as to face the display unit after passing through the boundary of a black matrix area and the active area.

* * * * *